Aug. 2, 1932.  J. P. ALDRICH ET AL  1,869,644
PRINT FORMING MACHINE
Filed Dec. 12, 1930

Inventors
John P. Aldrich
Howard A. Morris
By Owen & Owen
Attorneys

Patented Aug. 2, 1932

1,869,644

UNITED STATES PATENT OFFICE

JOHN P. ALDRICH AND HOWARD A. MORRIS, OF TOLEDO, OHIO, ASSIGNORS TO THE AUTOMAT MOLDING & FOLDING COMPANY, OF TOLEDO, OHIO, A CORPORATION OF OHIO

PRINT FORMING MACHINE

Application filed December 12, 1930. Serial No. 501,856.

This invention relates to machines for handling butter, or other materials of a similar plastic or semi-plastic nature, but more particularly to print forming machines to which the material is delivered from tubs or vats, and which forms the material into an elongate slab from which the bars of the desired size and weight are cut.

Machines of the above type frequently utilize a reciprocating plunger which pushes or forces the material through a restricted guideway in order to compact the same into an elongate slab, usually rectangular in shape. Due to the tight fit of the reciprocating plunger in the guideway and the sticky or plastic nature of the material which it engages, difficulty has been experienced in relieving the suction of the plunger during its retracting movement. In order to overcome this suction the plungers have been provided with valves, but these have not been found to be entirely satisfactory. Unless the suction is relieved, considerable power is necessary in order to operate the machine in a satisfactory manner.

An object of this invention is to overcome the above difficulties by providing simple and efficient means for relieving the suction in advance of the plunger.

Another object is to provide an apertured portion in the slab-forming channel or guide, which is so arranged as to relieve the suction on the plunger in its retracting movement, and further to recover the material squeezed through the apertured portion during the advancing movement of the plunger.

Figure 1:
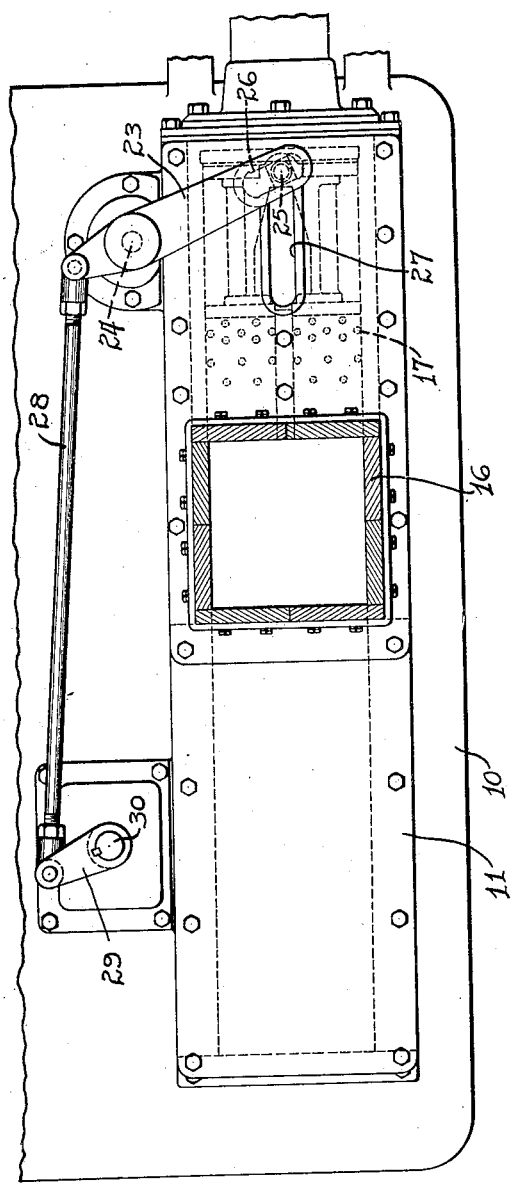
Figure 2:
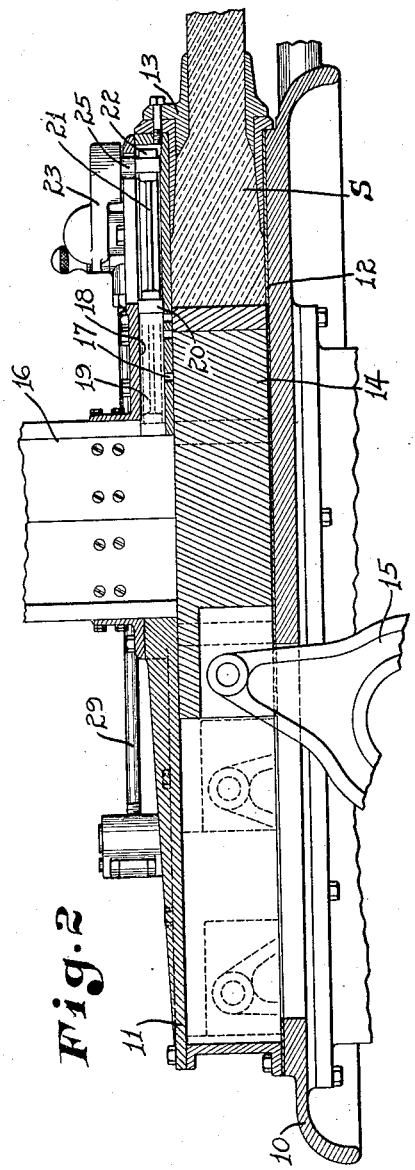

Further objects and advantages of the invention will hereinafter appear, and for purposes of illustration, but not of limitation, an embodiment of the invention is shown on the accompanying drawing, in which:

Fig. 1 is a top plan view partly in section of a portion of a print forming machine; and Fig. 2 is a longitudinal sectional view of the machine shown in Fig. 1.

The illustrated embodiment of the invention comprises a table 10, on which is mounted a casing 11. Within the casing 11 is provided a slab-forming channel or passageway 12. An elongate slab S is formed in the advanced or forward portion of the passageway 12, a reducer 13 being provided for reducing the size of the slab S in the outer end portion of the passageway 12.

Reciprocable throughout a portion of the passageway 12 is a plunger 14, which closely fits the passageway 12, and is of elongate form, substantially as shown. A rocker lever 15 is pivotally connected to the rear end portion of the plunger 14 for imparting reciprocatory movements to the plunger. Any suitable means (not shown) may be employed for operating the lever 15. The plunger is shown on Fig. 2 in full lines at its full advanced position, the two dotted line positions showing the plunger in different positions of its retracting movement.

Opening into the passageway 12 is a delivery means in the form of a chute or hopper 16 to which material, such as butter, is delivered. The butter is usually taken from tubs or vats and dumped into the chute 16 in chunks. The material drops from the chute 16 into the passageway 12 when the plunger 14 is in its retracted position. Such material is forced along the passageway 12 during the advancing movement of the plunger 14, thereby to compress and compact the material into the slab form S. It will thus be apparent that the material is progressively forced through the passageway 12 by the recurrent operation of the plunger 14. At all times a portion of the slab S remains within the passageway 12 in the form of the machine illustrated.

It is manifest that unless means are provided to relieve the condition the initial retracting movement of the plunger 14 tends to create a vacuum in the passageway 12 in rear of the slab S. This militates against the smooth operation of the machine. To relieve this condition, a series of apertures 17 are formed in the upper wall of the passageway 12 so that the tendency to create vacuum in the passageway 12 upon retracting movement of the plunger is relieved.

Mounted on the casing 11 over the apertured portion 17 is a housing 18, which forms with the upper wall of the passageway 12 a space 19, one end of which opens into the chute 16. Reciprocable in the space 19 is a scraper 20, which is adapted to return the material squeezed through the apertures 17 in the advancing movement of the plunger 14 back to the chute 16. When the plunger 14 advances to force the material into slab form, the air contained within the material and that which is in advance of the plunger through the apertures 17, and a small amount of material are at the same time forced through some of the apertures 17. This material is returned to the chute 16 substantially when the plunger has completed its advancing movement.

A plate 21 extends forwardly of the scraper 20, and the guide 22 is formed on the front end of the plate 21. For actuating the scraper 20 an arm 23 is pivoted at 24 on the table 10, and a pin 25 depends from the end of the lever 23, and is connected at its lower end to the scraper. The upper end of the pin 25 is movable in an elongate groove 26 formed in the underside of the lever 23. The pin 25 extends through an elongate slot 27 in the housing 18. It will thus be seen that swinging movements of the lever 23 impart reciprocating movements to the scraper 20 and associated parts.

Connected to the opposite end of the lever 23 is a rod 28, which is pivoted to an arm 29 fixed to a vertically disposed shaft 30. The shaft 30 may be operated in any suitable manner. As above pointed out, the scraper 20 is abruptly moved toward and away from the chute 16 substantially when the plunger 14 has completed its advancing movement so as to scrape the material which has been forced through the aperture 17 into the space 19 back into the chute. During the retracting movement of the plunger 14 the scraper 20 is disposed in the position shown in Fig. 2 and remains in such position until the plunger has again moved forwardly and has substantially completed its movement in that direction.

While we have described my improved machine in more or less detail to comply with the requirements of the statute, it is, nevertheless, desired that this detailed description be considered merely as illustrative and not as limiting, and it is to be understood that changes and modifications may be made by those skilled in this art without departing from the invention as defined in the following claims.

What we claim is:

1. In a machine for printing butter or the like, means providing a closed elongate passageway for the material, a plunger fitting said passageway and reciprocable therein for forcing the material progressively therethru, means for delivering material to said passageway in position to be engaged by said plunger during the advancing movement thereof, said passageway being apertured in advance of said delivery means thereby to relieve the suction of said plunger during its retracting movement, and a scraper movable over said apertured portion for removing material squeezed therethru during the advancing movement of said plunger.

2. In a machine for printing butter or the like, means providing a closed elongate passageway for the material, a plunger fitting said passageway and reciprocable therein for a portion of the length thereof for forcing the material progressively therethru, means for delivering material to said passageway in position to be engaged by said plunger during the advancing movement thereof, said passageway being apertured in advance of said delivery means thereby to relieve the suction of said plunger during its retracting movement, and a scraper movable over said apertured portion in timed relation to said plunger for removing material squeezed therethru during the advancing movement of said plunger.

3. In a machine for printing butter or the like, means providing a closed elongated passageway for the material, a plunger fitting said passageway and reciprocable therein for forcing material progressively therethru, means for delivering material to said passageway in position to be engaged by said plunger during the advancing movement thereof, said passageway being apertured in advance of said delivery means thereby to relieve the suction of said plunger during its retracting movement, a scraper movable over said apertured portion for removing material squeezed therethru during the advancing movement of said plunger, and means for automatically actuating said scraper substantially when said plunger has completed its advancing movement.

4. In a machine for printing butter or the like, means providing a closed elongate passageway for the material, a plunger fitting said passageway and reciprocable therein for forcing material progressively therethru, means for delivering material to said passageway in position to be engaged by said plunger during the advancing movement thereof, said passageway being apertured in advance of said delivery means thereby to relieve the suction of said plunger during its retracting movement, the outer surface of said apertured portion communicating with said delivery means, a scraper movable over said apertured portion for returning material squeezed therethru to said delivery means, and means for actuating said scraper.

5. In a machine for printing butter or the like, means providing a closed elongate passageway for the material, a plunger fitting said passageway and reciprocable therein for forcing material progressively therethru, means for delivering material to said passageway in position to be engaged by said plunger during the advancing movement thereof, one wall of said passageway having one or more restricted openings disposed in advance of said delivery means, the space above said openings communicating with said delivery means, a scraper movable over said space, for returning the material squeezed through said openings to said delivery means, and means operable in timed relation to said plunger for actuating said scraper to and from normal position substantially when said plunger has completed its advancing movement.

6. In a print-forming machine, means for forming a continuous slab of material, said means including a guideway and plunger movable to and fro in said guideway, and means to relieve the suction on said plunger during retracting movement, said last means including one or more restricted openings in a wall of said guideway and a scraper for removing the material squeezed thru said openings during the advancing movement of said plunger.

In testimony whereof we have hereunto signed our names to this specification.

JOHN P. ALDRICH.
HOWARD A. MORRIS.